(12) United States Patent
Wentroble et al.

(10) Patent No.: US 11,210,255 B2
(45) Date of Patent: *Dec. 28, 2021

(54) DETECTION OF DISPLAYPORT ALTERNATE MODE COMMUNICATION AND CONNECTOR PLUG ORIENTATION WITHOUT USE OF A POWER DISTRIBUTION CONTROLLER

(71) Applicant: TEXAS INSTRUMENTS INCORPORATED, Dallas, TX (US)

(72) Inventors: Mark Edward Wentroble, Plano, TX (US); Suzanne Mary Vining, Plano, TX (US); Hassan Omar Ali, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,073

(22) Filed: Dec. 10, 2019

(65) Prior Publication Data

US 2020/0110720 A1 Apr. 9, 2020

Related U.S. Application Data

(63) Continuation of application No. 16/033,873, filed on Jul. 12, 2018, now Pat. No. 10,545,904.

(51) Int. Cl.
*G06F 13/40* (2006.01)
*G06F 13/42* (2006.01)

(52) U.S. Cl.
CPC ........ *G06F 13/409* (2013.01); *G06F 13/4282* (2013.01); *G06F 2213/0042* (2013.01)

(58) Field of Classification Search
CPC ........ G06F 13/4282; G06F 2213/0042; G06F 13/409
See application file for complete search history.

(56) References Cited

U.S. PATENT DOCUMENTS

| | | | |
|---|---|---|---|
| 10,545,904 B1* | 1/2020 | Wentroble | .......... G06F 13/4282 |
| 2016/0110305 A1 | 4/2016 | Hundal et al. | |
| 2016/0127671 A1 | 5/2016 | Hundal et al. | |
| 2016/0147704 A1 | 5/2016 | Guillerm et al. | |
| 2016/0156137 A1 | 6/2016 | Pan et al. | |
| 2016/0253282 A1 | 9/2016 | Bowers et al. | |
| 2016/0253283 A1 | 9/2016 | Bowers et al. | |
| 2017/0109312 A1 | 4/2017 | Voor et al. | |

(Continued)

OTHER PUBLICATIONS

Notification of Transmittal of the International Search Report and the Written Opinion of the International Searching Authority, or the Declaration; dated Oct. 24, 2019; 7 pages.

(Continued)

*Primary Examiner* — Glenn A. Auve
(74) *Attorney, Agent, or Firm* — Charles F. Koch; Charles A. Brill; Frank D. Cimino

(57) ABSTRACT

This disclosure generally relates to USB TYPE-C, and, in particular, DISPLAYPORT Alternate Mode communication in a USB TYPE-C environment. In one embodiment, a device determines a DISPLAYPORT mode and determines an orientation of a USB TYPE-C connector plug. A multiplexer multiplexes a DISPLAYPORT transmission based in part on the determined orientation of the USB TYPE-C connector plug.

16 Claims, 4 Drawing Sheets

(56) References Cited

U.S. PATENT DOCUMENTS

| | | | |
|---|---|---|---|
| 2018/0032460 A1 | 2/2018 | Chuang et al. | |
| 2018/0062325 A1* | 3/2018 | Kim | H01R 13/703 |
| 2018/0143916 A1 | 5/2018 | Gupta et al. | |
| 2018/0341315 A1 | 11/2018 | Suganuma | |
| 2019/0042503 A1 | 2/2019 | Montero et al. | |
| 2019/0064899 A1* | 2/2019 | Doi | G06F 13/385 |
| 2019/0102335 A1 | 4/2019 | Tan et al. | |

OTHER PUBLICATIONS

Sadat Anwar et al.; Alternate Mode for USB Type-C (TM); Going beyond USB Mike Cambell Systems Engineering, Oct. 31, 2016, pp. 1-9, XP055831623, Retrieved from the Internet:https:/www.ti.com/lit/wp/slly021/slly021.pdf?ts=1628678327156&ref_url=https%3A%2F%2Fwww.google.com%2F [retrieved on Aug. 11, 2021].

"VESA DisplayPort Alt Mode for USB Type-?hyphen;C Standard", Vesa Sep. 22, 2014, pp. 1-17, XP055309813, Retrieved from the Internet:http://www,displayport.ort/wp-content/uploads/2014/09/DP-Alt-Mode-Overview-for-VESA-v1.pdf [retrieved on Oct. 12, 2016] p. 6.

Extended European Search Report dated Aug. 30, 2021.

\* cited by examiner

DETECTION OF DISPLAYPORT ALTERNATE MODE COMMUNICATION AND CONNECTOR PLUG ORIENTATION WITHOUT USE OF A POWER DISTRIBUTION CONTROLLER

CROSS-REFERENCE TO RELATED APPLICATIONS

This application is a continuation of U.S. patent application Ser. No. 16/033,873 filed Jul. 12, 2018, which is hereby fully incorporated herein by reference for all purposes.

TECHNICAL FIELD

This disclosure generally relates to USB TYPE-C, and, in particular, DISPLAYPORT Alternate Mode communication in a USB TYPE-C environment.

BACKGROUND

Universal Serial Bus (USB) is a peripheral interface for attaching a wide variety of computing devices, such as personal computers, digital telephone lines, monitors, modems, mice, printers, scanners, game controllers, keyboards, storage devices, and/or the like.

USB TYPE-C is a new standard under the USB umbrella. The USB TYPE-C connector supports power, data, and video at the same time. The TYPE-C connector supports up to 100 W of power delivery, up to 10 Gbps of USB SuperSpeed+ (SS+) data transfer and up to 8.1 Gbps of DISPLAYPORT Alternate Mode (DP Alt Mode) video. In addition to DP Alt Mode video, the TYPE-C connector supports various other DP Alt Mode video and data standards such as MHL, HDMI, and THUNDERBOLT.

The USB TYPE-C device that passes information through the USB TYPE-C connector and, specifically, the multiplexer in the USB TYPE-C device relies heavily on the Power Distribution (PD) controller to successfully perform operations. For that reason, the PD controller has to control the multiplexer through a control interface or directly through configuration pins. This type of operation imposes a hardware and software burden on the multiplexer and the PD controller. Moreover, dedicated pins need to be made available for the control interface on both the PD controller and the multiplexer, and the PD Controller needs to include the multiplexer in its firmware and other programming resources. Also, in the scenario of remote daughter cards, cables, or modules, long and cost-inefficient cabling may be required to connect the PD controller and the multiplexer.

SUMMARY OF PARTICULAR EMBODIMENTS

In accordance with this disclosure, a device determines a DISPLAYPORT mode and determines an orientation of a Universal Serial Bus (USB) TYPE-C connector plug. A multiplexer multiplexes a DISPLAYPORT transmission based in part on the determined orientation of the USB TYPE-C connector plug.

DESCRIPTION OF EXAMPLE EMBODIMENTS

The disclosure describes one or more methods for automatically detecting a Universal Serial Bus (USB) TYPE-C DISPLAYPORT Alternate Mode and orientation of a connector. In one embodiment, a device determines a DISPLAYPORT mode and determines an orientation of a USB TYPE-C connector plug. A multiplexer multiplexes a DISPLAYPORT transmission based in part on the determined orientation of the USB TYPE-C connector plug.

The disclosure may present several technical advantages. Technical advantages of the method may include reducing the amount of hardware resources, such as configuration pins on both the Power Distribution (PD) controller and the multiplexer and reducing the need for long cabling between both devices. Reducing the amount of hardware resources may also reduce the form size of the USB TYPE-C device. Another technical advantage of the method may include relieving the software burden on the PD controller and also the USB TYPE-C device.

Figure 1:
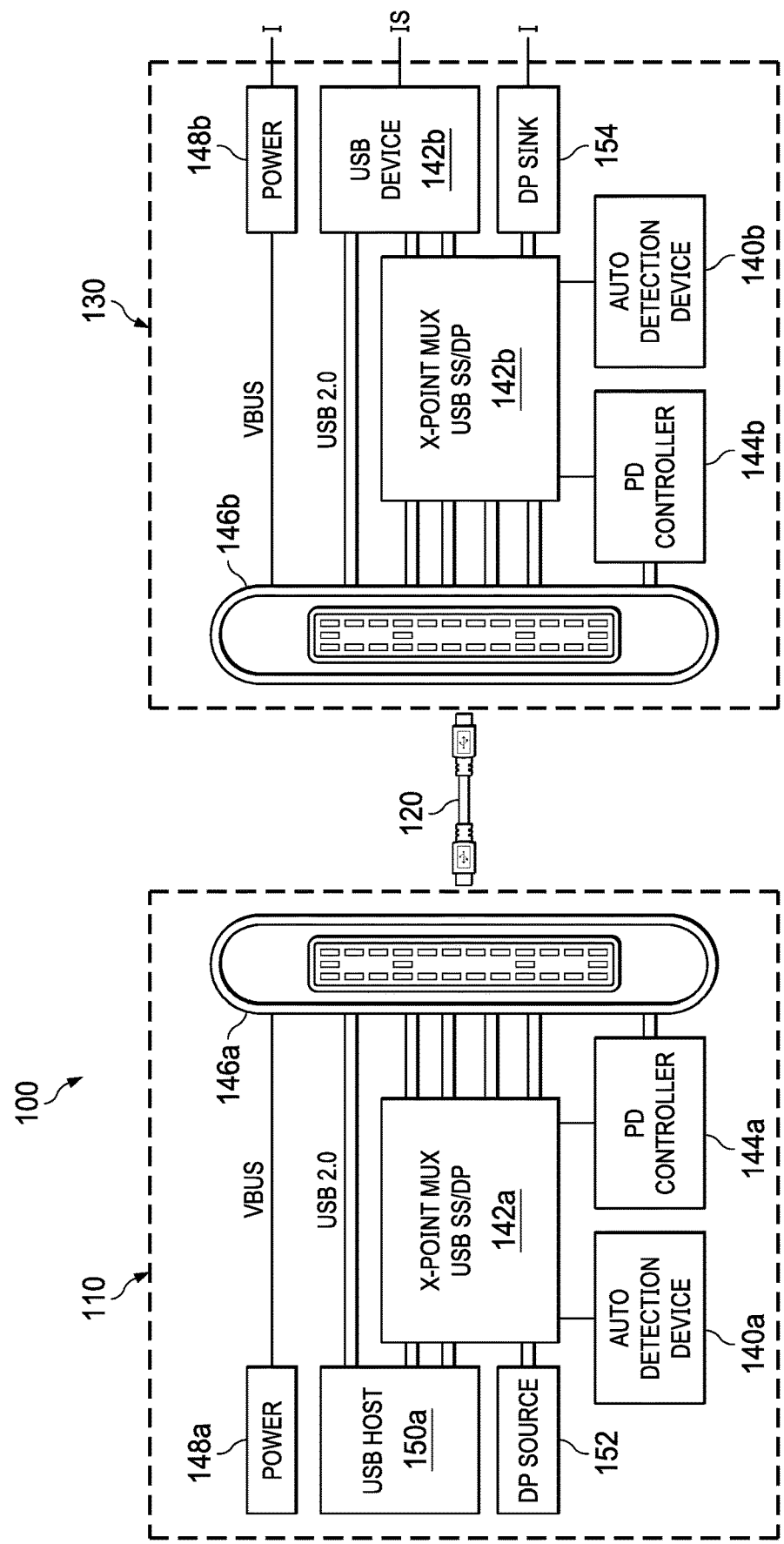
FIG. 1 illustrates a system architecture of a USB TYPE-C source device exchanging information with a USB TYPE-C sink device over a USB TYPE-C connector.

FIG. 1 illustrates system architecture 100 of USB TYPE-C source device 110 exchanging information with USB TYPE-C sink device 130 over USB TYPE-C connector 120.

As illustrated, source device 110 includes auto detection device 140*a*, multiplexer 142*a*, PD controller 144*a*, receptacle 146*a*, power supply 148*a*, USB device 150*a*, and DISPLAYPORT (DP) source 152. Source device 110 may include any device that is USB TYPE-C compatible, and may transmit DISPLAYPORT Alternate Mode (DP Alt Mode) information to sink device 130. Moreover, source device 110 may receive DP Alt Mode information from sink device 130.

Likewise, as illustrated, sink device 130 includes auto detection device 140*b*, multiplexer 142*b*, PD controller 144*b*, receptacle 146*b*, power supply 148*b*, USB device 150*b*, and DP sink 154. Sink device 130 may include any device that is USB TYPE-C compatible, and may receive DP Alt Mode information to source device 130. Moreover, sink device 130 may transmit DP Alt Mode information to source device 110.

Auto detection device 140 may comprise any device, circuitry, and/or logic that detects a DP Alt Mode and also detect the orientation of the plug. While illustrated as a separate component from multiplexer 142, auto detection device 140 may be incorporated in multiplexer 142, PD controller 144, and/or any other device, circuitry, and/or logic included in source device 110. In certain embodiments, auto detection device 140 is external to source device 110. Auto detection device 140 may be similar when implemented in source device 110 (e.g., auto detection device 140*a*) or sink device 130 (e.g., auto detection device 140*b*).

Multiplexer 142 may comprise any device, circuitry, and/or logic that selects one of several input signals and multiplexes the selected input to its proper internal port. Multiplexer 142 may help transfer signals received by receptacle 146 and may properly transfer that signal to USB host 150 and/or DP Alt Mode source 152. As explained in further detail below, multiplexer 142 may change the multiplexing of one or more received signals based on the connector plug orientation of connector 120. Multiplexer 142 may be similar when implemented in source device 110 (e.g., multiplexer 142*a*) or sink device 130 (e.g., multiplexer 142*b*).

In particular, multiplexer 142 connects sideband signaling (e.g., first sideband (SBU1) signal and second sideband (SBU2) signal) to its respective positive auxiliary and/or negative auxiliary ports. For example, multiplexer 142 may connect SBU1 and SBU2 signaling to its respective positive and/or negative auxiliary ports based on whether the device is a source or sink device and based on whether the connector plug orientation is normal or inverted. Specifically, multiplexer 142 may connect SBU1 and SBU2 signaling to its respective positive and/or negative auxiliary ports in the following manner:

TABLE 1

Transmission Based on Connector Orientation

| Source | | Sink | |
|---|---|---|---|
| Normal Orientation | Flipped Orientation | Normal Orientation | Flipped Orientation |
| SBU1 → AUXp | SBU1 → AUXn | SBU1 → AUXn | SBU1 → AUXp |
| SBU2 → AUXn | SBU2 → AUXp | SBU2 → AUXp | SBU2 → AUXn |

Directing data, video, and AUX signals to appropriate TYPE-C connector pins based on TYPE-C connector plug orientation and the location of the TYPE-C port (downstream facing port or an upstream facing port) is required to make the TYPE-C ecosystem work as intended. Conventionally, multiplexer 142 is needed to direct high-speed USB data, video, and auxiliary signaling to the appropriate pins. To properly complete this task, multiplexer 142 must be aware of the presence or absence of a DP Alt Mode and detect the TYPE-C connector plug orientation.

PD controller 144 may implement functionalities defined in the USB PD specification. Source device 110's host controller may manage and control the PD controller for power delivery. The commands may be communicated over a bus interface comprising a data line and a clock line. PD controller 144 may be similar when implemented in source device 110 (e.g., PD controller 144*a*) or sink device 130 (e.g., PD controller 144*b*).

Receptacle 146 may be any type of pinout that transmits and/or receives data, power, and/or video via connector 120. For example, receptacle 146*a* may transmit DP Alt Mode video information, USB data, and/or power from source device 110 via connector 120. As another example, receptacle 146*b* may receive DP Alt Mode video information, USB data, and/or power for sink device 130 via connector 120. The pinouts in receptacle 146 are explained in further detail in FIG. 2. Receptacle 146 may be similar when implemented in source device 110 (e.g., receptacle 146*a*) or sink device 130 (e.g., receptacle 146*b*).

USB device 150 may be any type of device, circuitry, and/or logic that is able to transmit and/or receive USB data. USB device 150 may be similar when implemented in source device 110 (e.g., USB device 150*a*) or sink device 130 (e.g., USB device 150*b*).

DP source 152 may be any type of device, circuitry, and/or logic that is able to transmit and/or receive DP Alt Mode data and/or information. DP Alt Mode may leverage the alternate mode function of the USB TYPE-C interface, and may provide video, SuperSpeed USB, and power all in one connector.

Connector 120 may be any type of connector that connects source device 110 and sink device 130. In particular, connector 120 plugs into receptacle 146*a* of source device 110 and receptacle 146*b* of sink device 130. Connector 120 supports the transfer of data, power, and/or video using the USB TYPE-C protocol. In particular connector 120 is able to support alt mode applications. Connector 120 may be reversible in that each end of the connector is able to plug into receptacle 146*a* of source device 110 and/or receptacle 146*b* of sink device 130. Moreover, connector 120 is able to be plugged into receptacle 146 in either a normal or inverted orientation.

As illustrated, source device 110 includes auto detection device 140*a*, multiplexer 142*a*, receptacle 146*a*, power supply 148*a*, USB device 150*a*, and DP source 152. Source device 110 may include any device that is USB TYPE-C compatible, and may receive DP Alt Mode information from sink device 110.

Likewise, as illustrated, sink device 130 includes auto detection device 140*b*, multiplexer 142*b*, receptacle 146*b*, power supply 148*b*, USB device 150*b*, and DP sink 154. Sink device 130 may include any device that is USB TYPE-C compatible, and may receive DP Alt Mode information from source device 110.

In an exemplary embodiment, multiplexer 142 may not receive signaling from PD controller 144, and, in particular, multiplexer 142 may not receive signaling from PD controller 144 indicating whether DP Alt Mode is present and/or the connector plug orientation of connector 120. Instead, auto detection device 140 may indicate to multiplexer 142 whether DP Alt Mode is present and/or the connector plug orientation of connector 120. In certain embodiments, source device 110 and/or sink device 130 may not comprise a PD controller 144. In certain embodiments, source device 110 and/or sink device 130 may comprise a PD controller 144, but PD controller 144 may not indicate to multiplexer 142 whether DP Alt Mode is present and/or the connector plug orientation of connector 120. Moreover, in certain embodiments, auto detection device 140 may be incorporated into multiplexer 142, or auto detection device 140 may be separate from multiplexer 142.

Auto detection device 140 determines the presence or absence of a DP Alt Mode by detecting a received signal on either the SBU1 pin or SBU2 pin. In certain embodiments, SBU1 and/or SBU2 only support the transmission of DP Alt Mode signals. Specifically, SBU1 and/or SBU2 may only be used as a DP Alt Mode auxiliary signal channeling in certain embodiments. Consequently, when auto detection device 140 determines the signal is being received on the SBU1 pin and/or SBU2 pin, auto detection device 140 may infer that a device that supports DP Alt Mode is connected.

In certain embodiments, auto detection device 140 detects the presence and/or absence of DP Alt Mode by detecting a reception of one or more signals in either the SBU1 pin or SBU2 pin of the device. In certain embodiments, auto detection device 140 may detect a transmitted signal in the positive auxiliary that is connected to either the SBU1 pin or SBU2 pin and/or in the negative auxiliary that is connected to either the SBU1 pin of SBU2 pin.

Moreover, auto detection device 140 may detect a received signal in either the SBU1 pin or the SBU2 pin by detecting a pull up (e.g., a high voltage) on the SBU1 pin or SBU2 pin. For example, in auto detection device 140 in source device 110, auto detection device 140 may detect a transmitted signal by detecting a high voltage on the SBU1 pin indicating a signal transmission via a pull-up resistor. Similarly, in auto detection device 140 in sink device 130, auto detection device 140 may detect a signal transmission by detecting a high voltage on the SBU2 pin indicating a signal transmission via a pull-up resistor.

In certain embodiments, auto detection device 140 and/or multiplexer 142 may know whether the auto detection device 140 and/or multiplexer 142 is in a source device or sink device via a pin, memory, and/or register in the device.

In certain embodiments, the auxiliary signal may not be transmitted to auto detection device 140. In this embodiment, auto detection device 140 snoops the USB data line to determine display port mode. The USB data line may use low frequency polling signaling before transmitting the USB data. For transmitting DP Alt Mode information, however, the USB data line may not communicate a low frequency polling signaling. Accordingly, auto detection device 140 may detect a high-speed signal without low frequency periodic signaling signals and, therefore, determine that DP Alt Mode information is then being sent across the USB data line. By submitting DP Alt Mode information across USB data line, auto detection device 140 determines that the communication is DP Alt Mode four-lane. DP Alt Mode four-lane can carry four DISPLAYPORT lanes across connector 120. In certain embodiments, auto detection device 140 may detect a low-speed signal and low frequency periodic signaling signals, and, therefore, determine that DP Alt Mode information is not being sent across USB data line. Because USB data line is not transmitting DP Alt Mode information, auto detection device 140 determines that the communication is either DP Alt Mode one-lane or DP Alt Mode two-lane. Unlike DP Alt Mode four-lane, DP Alt Mode two-lane can carry two DISPLAYPORT lanes across connector 120 and DP Alt Mode one-lane can only carry one DISPLAYPORT lane across connector 120.

Auto detection device 140 may also determine the connector plug orientation based on the type of signal transmission on SBU1 and/or SBU2. Based on the type of signal transmission on SBU1 and/or SBU2 at the positive auxiliary and/or the negative auxiliary, auto detection device 140 may determine the connector plug orientation. For example, auto detection device 140 in source device 110 may detect that the SBU1 signal is communicated to the positive auxiliary. Accordingly, auto detection device 140 may then be able to detect that connector 120 is connected to the normal orientation. Likewise, auto detection device 140 in source device 110 may detect that SBU1 is communicated to the negative auxiliary. Accordingly, auto detection device 140 may then be able to detect that connector 120 is connected in an inverted orientation. Moreover, as another example, auto detection device 140 in sink device 130 may detect that the SBU1 signal is communicated to the negative auxiliary. Auto detection device 140 may then detect the connector 120 is in a normal orientation. As a final example, auto detection device 140 may detect that the SBU1 signal is communicated to the positive auxiliary, and, accordingly, auto detection device 140 may then the deduce that connector 120 is in an inverted orientation.

The following table illustrates an exemplary embodiment of the conditions used by auto deduction device 140 to determine the orientation of connector 120:

TABLE 2

Exemplary Logic for Determining Connector Orientation

| | SOURCE | SINK |
|---|---|---|
| SBU1 → AUXp<br>SBU2 → AUXn | Normal Orientation | Inverted Orientation |
| SBU1 → AUXn<br>SBU2 → AUXp | Inverted Orientation | Normal Orientation |

In certain embodiments, auto detection device 140 may detect the presence of the DP Alt Mode and/or orientation of connector 120 based on snooping the auxiliary signal. As discussed earlier, whenever DP Alt Mode is present, the DP Alt Mode signals are communicated over the auxiliary channel. By performing auxiliary channel snooping, the presence of DP Alt Mode is established when a valid auxiliary is detected. In certain embodiments, the orientation of connector 120 is determined by analyzing the preamble of the auxiliary signal.

Moreover, the orientation can be detected through a Manchester decoding scheme of either the positive auxiliary and negative auxiliary signal. First, auto detection device 140 analyzes a number of clock cycles (e.g., 28 clock cycles) to determine a current state of the auxiliary signal. At this point, a state machine for auto detection device 140 is in Acquire Mode.

After a number of clock cycles pass, the state machine for auto detection device 140 moves to Sync High State mode. In Sync High State mode, the Manchester logic is searching for a Manchester violation in the auxiliary signal. A Manchester violation is a received signal level that is different than what auto detection device 140 anticipates. For example, if auto detection device 140 is anticipating a high auxiliary signal because auto detection device 140 assumes the connector plug orientation is normal but, instead, receives a low auxiliary signal, then the auto detection device 140 detects a Manchester violation. Accordingly, auto detection device 140 knows that the connector 120 is inverted and sets an internal inverted orientation flag.

Auto detection device 140 may also reset its state machine if a Manchester violation occurs. In certain embodiments, during the Sync High State mode, the only expected input is an input signal that is between 1 and 5 clock lengths. If a signal is received that is less than 1 clock length or greater than 5 clock lengths, then a Manchester violation has occurred and auto detection device 140 may reset the state machine.

The state machine may then move to Sync Low State mode. In Sync Low State mode, auto detection device 140 may anticipate a valid low auxiliary signal. However, when the auxiliary signal changes to high again, auto detection device 140 may set an internal inverted orientation flag, and the auxiliary signal inversion will be applied for the remainder of the signal.

By determining whether the connector plug orientation is normal or inverted using the preamble of the auxiliary signal, the signal's polarity has already been corrected by the time the first data bit in the auxiliary signal arrives.

Another component that may determine the connector plug orientation is the auxiliary port polarity. The auxiliary port polarity can be recognized based on the polarity of the first packet of the auxiliary signal.

Moreover, by snooping the auxiliary signal, auto detection device 140 can detect from the auxiliary signal the number of lanes transmitting DP Alt Mode. For example, the auxiliary signal data stream may indicate that the DP Alt Mode signal is being transmitted on two lanes (i.e., DP 2 Lane mode). As another example, the auxiliary signal data stream may indicate DP Alt Mode signal is being transmitted on four lanes (i.e., DP 4 Lane mode). In certain exceptional cases, auto detection device 140 may activate DP 2 Lane Mode even if the auxiliary signal data stream indicates that only one lane is transmitting DP Alt Mode information.

Figure 3:
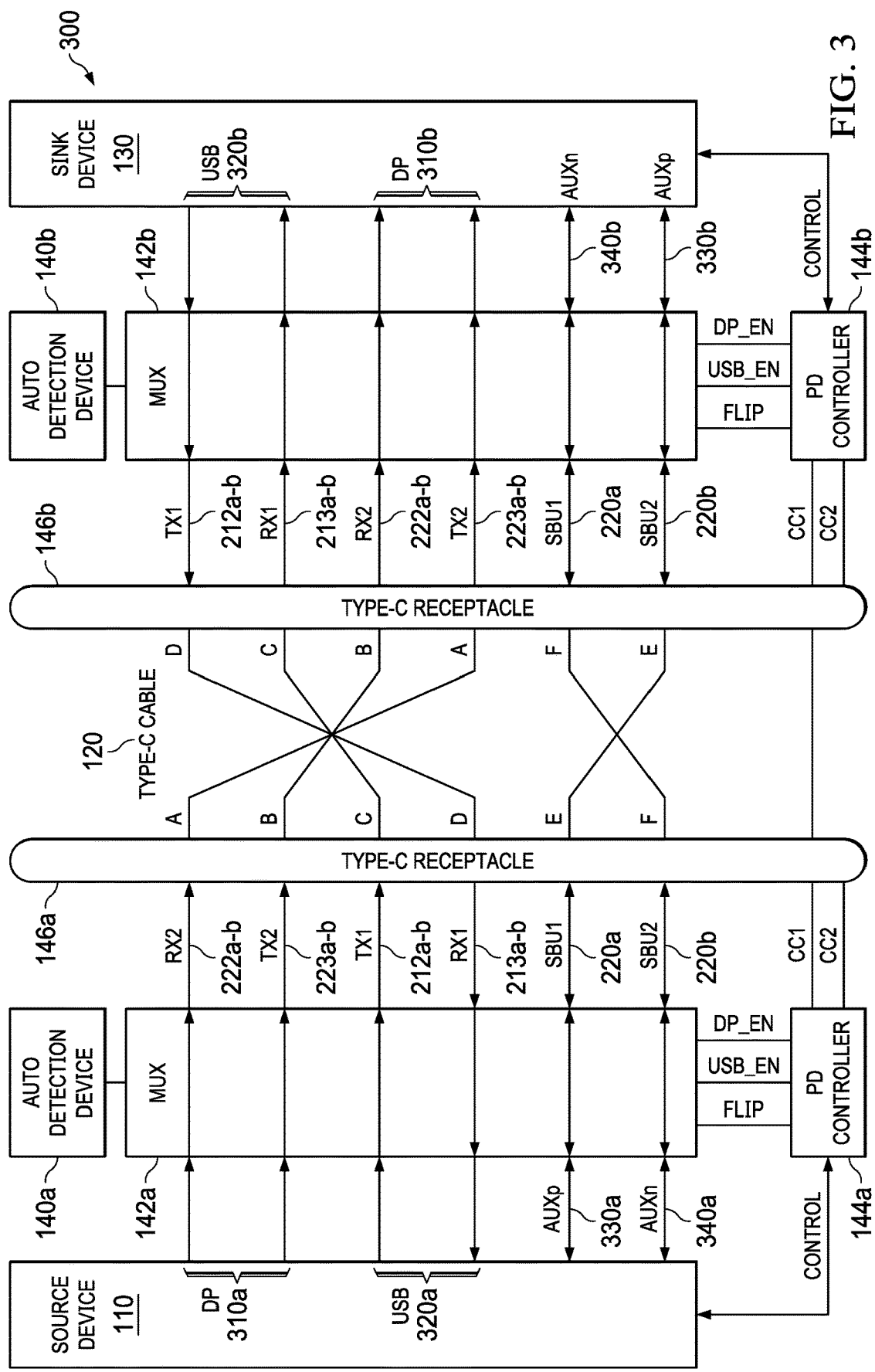
FIG. 3 illustrates a connection between a USB TYPE-C source device and a USB TYPE-C sink device in a normal connector plug orientation.
Figure 4:
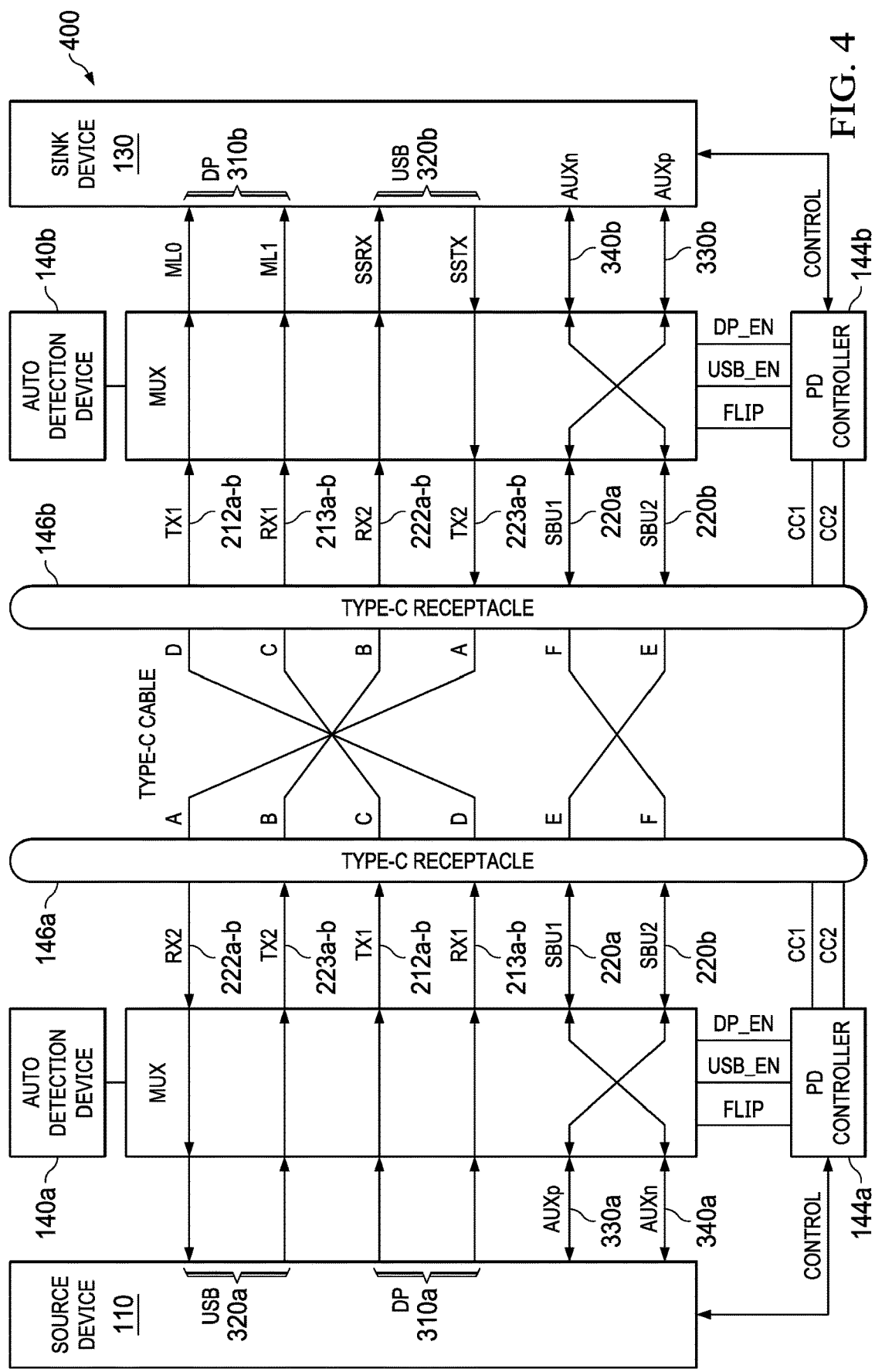
FIG. 4 illustrates a connection between a USB TYPE-C source device and a USB TYPE-C sink device in an inverted connector plug orientation.

Now, given the detection of the orientation of connector 120, the detection of the transmitted DP Alt Mode signal, and knowledge of whether the device is a source device 110 or sink device 130, multiplexer 142 is then able to properly direct the input signals to the proper internal ports. For example, multiplexer 142 may multiplex one or more DP signals based on the determined orientation of the USB TYPE-C connector plug. As another example, multiplexer 142 may multiplex the received signal at the SBU1 pin and/or SBU2 pin based on the determined orientation of the USB TYPE-C connector plug. FIG. 3 and FIG. 4 illustrates in further detail the proper multiplexing of received signals by multiplexer 142 based on these variables.

Multiplexer 172 may multiplex the display port transmission differently depending on the orientation of USB TYPE-C connector 120. Similarly, the signal received at the SBU1 pin and/or the SBU2 pin may be multiplexed different depending on the orientation of the USB TYPE-C connector 120.

Figure 2:
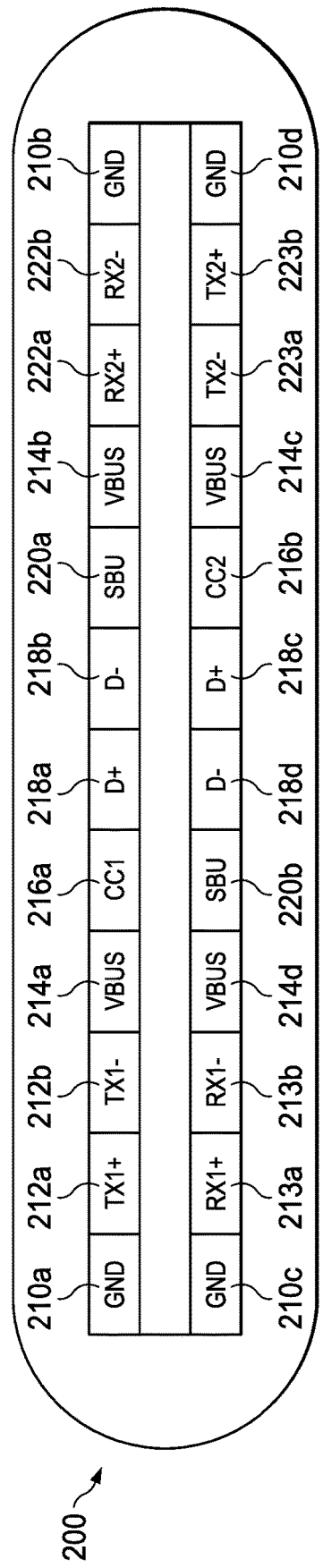
FIG. 2 illustrates a USB TYPE-C connector pinout.

FIG. 2 illustrates a USB TYPE-C connector pinout 200. USB TYPE-C connector pinout 200 may be found in receptacle 146 of source device 110, receptacle 146 of sink device 130, and/or connector plug of connector 120. In the illustrated embodiment, connector pinout 200 comprises ground pins 210a-d, TX1+/− signal pins 212a-b, RX1+/− signal pins 213a-b, bus power pin 214a-d, configuration channel pins 216a-b, USB data pins 218a-d, sideband pins 220a-b, RX2+/− signal pins 222a-b, and TX2+/− signal pins 223a-b.

In normal TYPE-C connector plug orientation, USB data passes through TX1+/− signal pins 212a-b and RX1+/− signal pins 213a-b, and, in the flipped connector plug orientation, USB data passes through TX2+/− signal pins 223a-b and RX2+/− signal pins 222a-b. When 2 lanes of DP Alt Mode video are also transmitted along with USB data, in the normal TYPE-C connector plug orientation, DP Alt Mode video is channeled through TX2+/− signal pins 223a-b and RX2+/− signal pins 222a-b, and, in the flipped connector plug orientation, USB data goes through TX1+/− signal pins 212a-b and RX1+/− signal pins 213a-b. If there is no USB data, all the four differential pair pins (TX1+/−, RX1+/−, TX2+/−, and RX2+/−) can be used to transfer four lanes of DP Alt Mode signals.

DP Alt Mode video also involves low-speed Auxiliary (AUX) signal that is transmitted through the sideband pins 220a-b of the TYPE-C connector. In the illustrated Figure, sideband pin 220a represents the SBU1 pin and sideband pin 220b represents the SBU2 pin. AUX signal is differential with two single-ended signals of opposite polarity—positive (AUXP) and negative (AUXN). AUXP and AUXN are connected to either SBU1 or SBU2 depending on the TYPE-C connector plug orientation and whether the TYPE-C connector is on a downstream facing port (DFP) or an upstream facing port (UFP).

FIG. 3 illustrates a connection between a USB TYPE-C source device and a USB TYPE-C sink device in a normal connector plug orientation. In the illustrated embodiment, receptacle 146a and receptacle 146b share the same pin layout as illustrated in FIG. 2. While illustrated as a separate component, source device 110 may comprise auto detection device 140a, multiplexer 142a, and/or PD controller 144a. Similarly, while illustrated as a separate component, sink device 130 may comprise auto detection device 140b, multiplexer 142b, and/or PD controller 144b.

Moreover, by illustration, the connections between receptacle 146a and 146b are represented by alphabetical indicators. Each alphabetical indicator represents a connection between the two pins. For example, RX2 222 in receptacle 146a (as indicated by the letter 'A') is connected to TX2 223 in receptacle 146b (as also indicated by the letter 'A').

As illustrated, in normal TYPE-C connector plug orientation for source device 110, USB data 320a passes through TX1+/− signal pins 212 and RX1+/− signal pins 213 and, when 2 lanes of DP Alt Mode information 310a are transmitted, the 2 lanes of DP Alt Mode information 310a are transmitted along TX2+/− signal pins 223 and RX2+/− signal pins 222. DP Alt Mode video also involves a low-speed AUX signal that gets transmitted through sideband pins 220. In normal TYPE-C connector plug orientation, AUXp 330a is connected to SBU1 pin 220a and AUXn 220b is connected to SBU2 pin 220b.

As further illustrated, in normal TYPE-C connector plug orientation for sink device 130, USB data 320b passes through TX1+/− signal pins 212 and RX1+/− signal pins 213 and, when 2 lanes of DP Alt Mode information 310b are transmitted, the 2 lanes of DP Alt Mode information 310a are transmitted along TX2+/− signal pins 223 and RX2+/− signal pins 222. Similar to the DP Alt Mode video transferred on source side 110, DP Alt Mode video also involves a low-speed AUX signal that gets transmitted through sideband pins 220a-b. In normal TYPE-C connector plug orientation, AUXp 330b is connected to SBU2 pin 220b and AUXn 340b is connected to SBU1 pin 220a on sink device 130.

Given the detection of the orientation of connector 120, the detection of the transmitted DP Alt Mode signal, knowledge of whether the device is a source device 110 or sink device 130, multiplexer 142 is then able to properly direct the input signals to the proper output ports as illustrated in FIG. 3 for a normal connector plug orientation.

FIG. 4 illustrates a connection between a USB TYPE-C source device and a USB TYPE-C sink device in an inverted connector plug orientation. In the illustrated embodiment, receptacle 146a and receptacle 146b share the same pin layout as illustrated in FIG. 2. While illustrated as a separate component, source device 110 may comprise auto detection device 140a, multiplexer 142a, and/or PD controller 144a. Similarly, while illustrated as a separate component, sink device 130 may comprise auto detection device 140b, multiplexer 142b, and/or PD controller 144b.

Moreover, by illustration, the connections between receptacle 146a and 146b are represented by alphabetical indicators. Each alphabetical indicator represents a connection between the two pins. For example, RX2 222a-b in receptacle 146a (as indicated by the letter 'A') is connected to TX2 223a-b in receptacle 146b (as also indicated by the letter 'A').

As illustrated, in an inverted TYPE-C connector plug orientation for source device 110, USB data 320a passes through TX2+/− signal pins 223*a-b* and RX2+/− signal pins 222*a-b* and, when 2 lanes of DP Alt Mode information 310*a* are transmitted, the 2 lanes of DP Alt Mode information 310*a* are transmitted along TX1+/− signal pins 212*a-b* and RX1+/− signal pins 213*a-b*. DP Alt Mode video also involves a low-speed AUX signal that gets transmitted through sideband pins 220*a-b*. In normal TYPE-C connector plug orientation, AUXp 330*a* is connected to SBU2 pin 220*b* and AUXn 340*a* is connected to SBU1 pin 220*a* on source device 110.

As further illustrated, in an inverted TYPE-C connector plug orientation for sink device 130, USB data 320*b* passes through TX2+/− signal pins 223*a-b* and RX2+/− signal pins 222*a-b* and, when 2 lanes of DP Alt Mode information 310*b* are transmitted, the 2 lanes of DP Alt Mode information 310*a* are transmitted along TX1+/− signal pins 212*a-b* and RX1+/− signal pins 213*a-b*. Similar to the DP Alt Mode video transferred on source side 110, DP Alt Mode video also involves a low-speed AUX signal that gets transmitted through sideband pins 220*a-b*. In an inverted TYPE-C connector plug orientation, AUXp 330*b* is connected to SBU1 pin 220*a* and AUXn 340*b* is connected to SBU2 pin 220*b* on sink device 130.

Given the detection of the orientation of connector 120, the detection of the transmitted DP Alt Mode signal, knowledge of whether the device is a source device 110 or sink device 130, multiplexer 142 is then able to properly direct the input signals to the proper output ports as illustrated in FIG. 4 for an inverted connector plug orientation.

Figure 5:
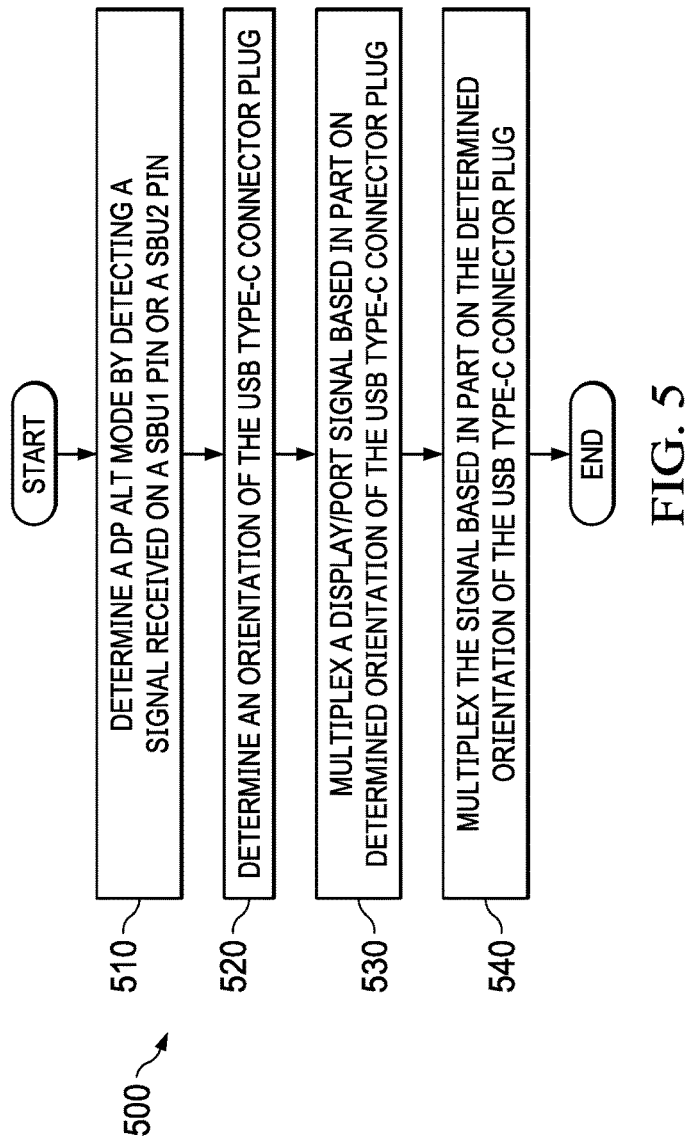
FIG. 5 illustrates an example method for detecting a DISPLAYPORT Alternate Mode transmission and connector plug orientation.

FIG. 5 illustrates example method 500 for detecting a DISPLAYPORT Alternate Mode transmission and connector plug orientation.

The method may begin at step 510, where a device determines a DISPLAYPORT Alt Mode by detecting a signal received on either the SBU1 pin or the SBU2 pin. In certain embodiments, SBU1 pin and/or SBU2 pin only support the transmission of DP Alt Mode signals. Specifically, SBU1 and/or SBU2 may only be used as a DP Alt Mode auxiliary signal port in certain embodiments. Consequently, when auto detection device 140 determines the signal is being received on SBU1 and/or SBU2, auto detection device 140 may infer that a device that supports DP Alt Mode is connected.

In certain embodiments, auto detection device 140 by detecting a high voltage (i.e., a pull up) on the SBU1 pin or SBU2 pin. Alternatively, auto detection device 140 may detect a signal transmission by detecting a pull up on the positive auxiliary and/or negative auxiliary.

In addition, auto detection device 140 then detects a signal transmission in the SBU1 pin or SBU2 pin. Moreover, in certain embodiments, auto detection device 140 and/or multiplexer 142 may know whether the auto detection device 140 and/or multiplexer 142 is in a source device or sink device via a pin, memory, and/or register in the device.

At step 520, auto detection device 140 may also determine the connector plug orientation based on a signal transmission on SBU1 and/or SBU2. Based on the signal transmission on SBU1 at the positive or negative auxiliary and/or SBU2 at the positive or negative auxiliary, auto detection device 140 may determine the connector plug orientation. For example, auto detection device 140 in source device 110 may detect that the SBU1 signal is communicated to the positive auxiliary. Accordingly, auto detection device 140 may then be able to detect that connector 120 is connected to the normal orientation. Likewise, auto detection device 140 in source device 110 may detect that SBU1 signal is communicated to the negative auxiliary. Accordingly, auto detection device 140 may then be able to detect that connector 120 is connected in an inverted orientation. Moreover, as another example, auto detection device 140 in sink device 130 may detect that the SBU1 signal is communicated to the negative auxiliary. Auto detection device 140 may then detect the connector 120 is in a normal orientation. As a final example, auto detection device 140 may detect that the SBU1 signal is communicated to the positive auxiliary, and, accordingly, auto detection device 140 may then the deduce that connector 120 is in an inverted orientation.

At step 530, multiplexer 142 multiplexes a DP signal based in part on the determined orientation of the USB TYPE-C connector plug. At step 540, multiplexer 142 multiplexes the SBU1 signal and/or the SBU2 signal based in part on the determined orientation of the USB TYPE-C connector plug.

In particular embodiments, one or more computer systems perform one or more steps of one or more methods described or illustrated herein. In particular embodiments, one or more computer systems provide functionality described or illustrated herein. In particular embodiments, software running on one or more computer systems on a non-transitory storage media performs one or more steps of one or more methods described or illustrated herein or provides functionality described or illustrated herein. Particular embodiments include one or more portions of one or more computer systems. Herein, reference to a computer system may encompass a computing device, and vice versa, where appropriate. Moreover, reference to a computer system may encompass one or more computer systems, where appropriate.

What is claimed is:

1. A method, comprising:
   determining, by a first device, a DisplayPort mode by detecting a received signal on a first sideband use (SBU1) pin of the first device or a second sideband use (SBU2) pin of the first device;
   determining, by the first device, an orientation of a USB Type-C connector plug; and
   transmitting, to a second device, a DisplayPort transmission based in part on the determined orientation of the USB Type-C connector plug.

2. The method of claim 1, wherein detecting a received signal on a SBU1 pin of the first device or a SBU2 pin of the first device comprises detecting a pull up in either the SBU1 pin or the SBU2 pin.

3. The method of claim 1, further comprising transmitting the received signal based in part on the determined orientation of the USB Type-C connector plug.

4. The method of claim 1, wherein determining an orientation of a USB Type-C connector plug comprises determining an orientation of a USB Type-C connector plug by detecting a type of the received signal.

5. The method of claim 1, wherein the second device comprises one of the following:
   a source device coupled to a USB Type-C connector plug with a normal orientation;
   a source device coupled to a USB Type-C connector plug with an inverted orientation;
   a sink device coupled to a USB Type-C connector plug with a normal orientation; or
   a sink device coupled to a USB Type-C connector plug with an inverted orientation.

6. The method of claim 1, wherein the first device does not comprise a PD controller.

7. A system, comprising:
a first device configured to:
- determine a DisplayPort mode by detecting a received signal on a first sideband use (SBU1) pin of the device or a second sideband use (SBU2) pin of the device;
- determine an orientation of a USB Type-C connector plug; and
- transmit a DisplayPort transmission to a second device based in part on the determined orientation of the USB Type-C connector plug.

8. The system of claim 7, wherein detecting a received signal on a SBU1 pin of the first device or a SBU2 pin of the first device comprises detecting a pull up in either the SBU1 pin or the SBU2 pin.

9. The system of claim 7, wherein the first device is further configured to transmit the received signal based in part on the determined orientation of the USB Type-C connector plug.

10. The system of claim 7, wherein determining an orientation of a USB Type-C connector plug comprises determining an orientation of a USB Type-C connector plug by detecting a type of the received signal.

11. The system of claim 7, wherein the second device comprises one of the following:
- a source device coupled to a USB Type-C connector plug with a normal orientation;
- a source device coupled to a USB Type-C connector plug with an inverted orientation;
- a sink device coupled to a USB Type-C connector plug with a normal orientation; or
- a sink device coupled to a USB Type-C connector plug with an inverted orientation.

12. The system of claim 7, wherein the first device does not comprise a PD controller.

13. One or more computer-readable non-transitory storage media embodying software that is operable when executed to:
- determine a DisplayPort mode by detecting a received signal on a first sideband use (SBU1) pin of a first device or a second sideband use (SBU2) pin of the first device;
- determine an orientation of a USB Type-C connector plug; and
- transmit a DisplayPort transmission to a second device based in part on the determined orientation of the USB Type-C connector plug.

14. The media of claim 13, wherein detecting a received signal on a SBU1 pin of the first device or a SBU2 pin of the first device comprises detecting a pull up in either the SBU1 pin or the SBU2 pin.

15. The media of claim 13, wherein the software is further operable when executed to transmit the received signal based in part on the determined orientation of the USB Type-C connector plug.

16. The media of claim 13, wherein determining an orientation of a USB Type-C connector plug comprises determining an orientation of a USB Type-C connector plug by detecting a type of the received signal.

* * * * *